No. 722,769. PATENTED MAR. 17, 1903.
J. A. SWENSON.
AUTOMATIC LUBRICATOR.
APPLICATION FILED JULY 14, 1902.
NO MODEL.
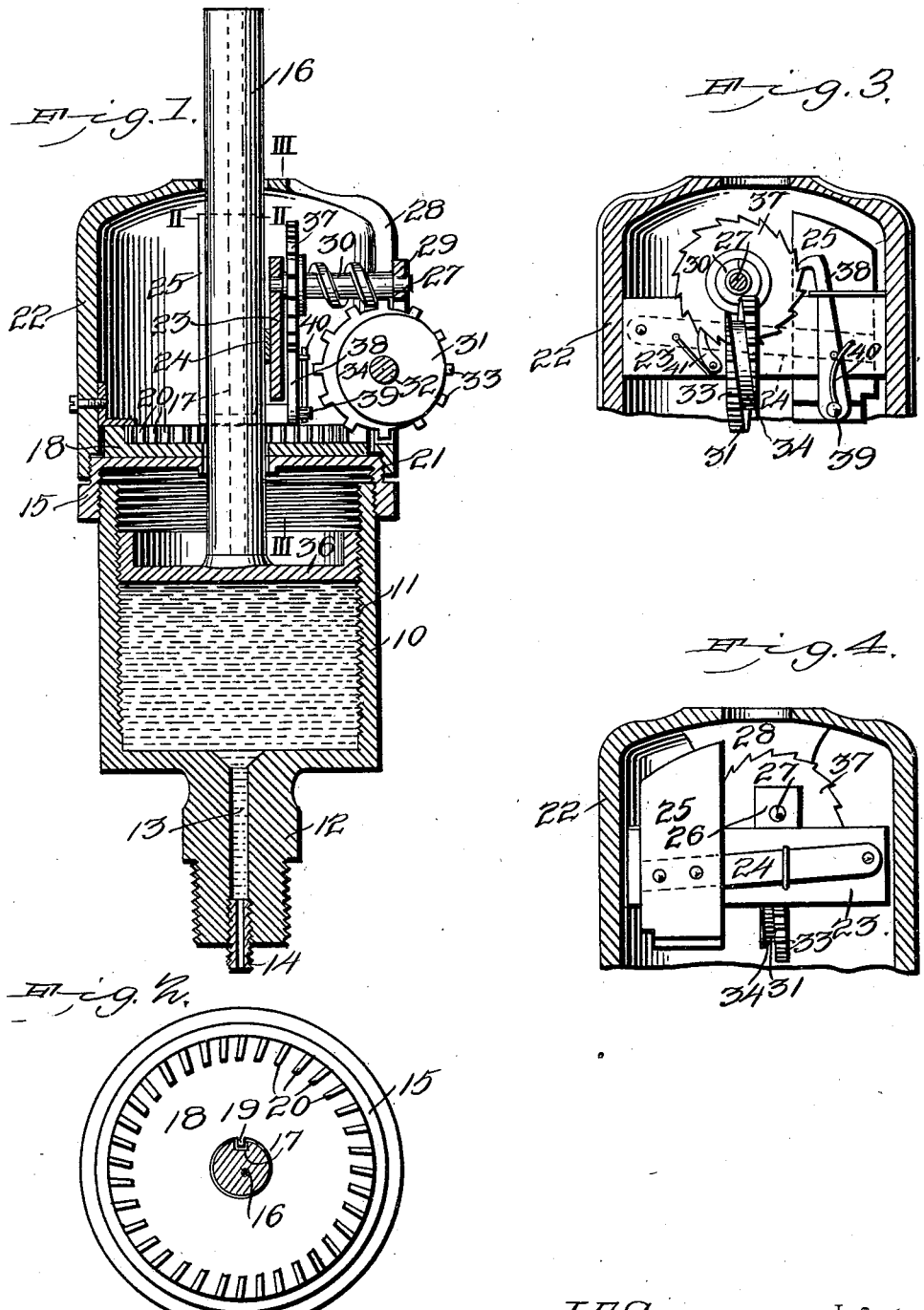

UNITED STATES PATENT OFFICE.

JONAS AUGUST SWENSON, OF McPHERSON, KANSAS.

AUTOMATIC LUBRICATOR.

SPECIFICATION forming part of Letters Patent No. 722,769, dated March 17, 1903.

Application filed July 14, 1902. Serial No. 115,533. (No model.)

*To all whom it may concern:*

Be it known that I, JONAS AUGUST SWENSON, a citizen of the United States, residing at McPherson, in the county of McPherson and State of Kansas, have invented a new and useful Automatic Lubricator, of which the following is a specification.

This invention relates to that class of lubricators employed for the lubrication of crank-pins, wrist-pins, connecting-rods, and other moving or oscillating parts of machinery, and has for its object the production of a simple compact device wherein the motion of the part of the machinery to which it is attached will be utilized to actuate means for feeding the lubricant therefrom as fast as required.

The invention consists in an internally-threaded cylinder having a threaded piston and means operative by the motion of the part of the machinery to which it is attached to forcibly expel the lubricant from the cylinder as required.

The invention further consists in certain novel features of construction, as hereinafter shown and described, and specified in the claims.

In the drawings illustrative of the invention, Figure 1 is a vertical sectional elevation. Fig. 2 is a plan view on the line II II of Fig. 1. Fig. 3 is a sectional detail of the upper part of the device, with the casing in section on the line III III of Fig. 1 looking inward. Fig. 4 is a similar view of the same parts looking outward.

This device will be employed in connection with the moving parts of machinery—such as crank-pins, wrist-pins, connecting-rods, walking-beams, and other parts having a reciprocatory or oscillatory motion—and consists in a casing 10, preferably cylindrical, for containing the lubricant and internally threaded, as at 11, and with a threaded plug 12 extending from its lower end, by which it may be attached to the part of the machinery which it is designed to lubricate. The plug 12 will be provided with an internal longitudinal aperture 13 for the passage of lubricant from the cylinder, the exit end of the aperture preferably provided with a reducing-plug 14 to control the outflow. The reducing-plug 14 will be provided with a small longitudinal aperture, the size of this aperture corresponding to the nature of the lubricant which it is desired to use. The plug 14 will be easily detachable, so that a plug having a larger or a smaller aperture may be substituted, and thus render the device adaptable to different kinds of lubricants. This is an important feature of the device, as it enables the same size of cylinder 10 to be readily adapted to different kinds of machinery and also to different qualities and consistency of the lubricant. In machinery wherein the cylinder 10 is liable to be subjected to heat the lubricant would run more freely than in that class of machinery where the cylinder remains cool, and under such circumstances the plug 14 would require a much smaller aperture to enable the same quantity of lubricant to pass in a given time. With this simple expedient, however, the device may be readily adapted to all the varying conditions and temperatures under which it will be employed. The size of the cylinder 10 will be varied to correspond to machinery to which it is applied and may be made small enough to fit the smallest sizes of moving parts or the largest sizes, as will be understood. The cylinder 10 will be provided with a screw-cover 15, having a central aperture through which the piston-rod 16 extends, the latter having a longitudinal groove 17 and connected to a piston-head 36, having a peripheral screw-thread engaging the thread 11 in the cylinder, as shown in Fig. 2.

Resting loosely upon the top of the cover 15 is a disk 18, having a central aperture fitting the piston 16 and with a fin or key 19 engaging the groove 17 in the piston-rod, as shown in Fig. 2, so that rotary motion imparted to the disk 18 will be transmitted through the key 19 to the piston-rod 16 and cause the latter to be moved up and down in the cylinder through the medium of the threads 11, while at the same time the disk remains in its position upon the cover 15.

Extending upward from the outer edge of the disk 18 are obliquely-disposed gear-teeth 20, the disposition of these teeth being represented more fully in Fig. 2, the object of these oblique teeth being hereinafter more fully explained.

The top 15 of the cylinder 10 is provided with an external screw-thread 21 upon its upper part, and engaging this screw-thread is an upper casing or shell 22, forming a supplemental chamber above the cylinder 10 and through whose upper part the piston-rod 16 extends, as shown. Transversely disposed across this shell 22, adjacent to the piston-rod 16, is a supporting-bar 23, and pivotally engaging this cross-bar is a lever-arm 24, the outer end of the lever-arm being provided with a weight 25, as shown more clearly in Fig. 4.

Journaled at one end in a projection 26 upon the bar 23 is a small shaft 27, the shaft extending outward through an aperture 28 in the side of the shell 22 and supported at its outer end by a hanger 29, attached to the shell. The shaft 27 is provided with a worm 30, as shown in Figs. 1 and 3, adapted to engage a worm-gear 31, of peculiar construction, mounted upon a shaft 32, which is supported by its ends at right angles to the shaft 27. The shaft 32 is journaled by its ends in the shell 22, so that the worm-gear 31 operates through the slot 28 below the worm 30 and engages the latter by its upper periphery and likewise engages the tangential teeth 20 by its lower periphery. The wheel 31 is of peculiar construction and consists of an ordinary worm-gear with a square screw-thread cut circumferentially therein transversely of the teeth, so that a compound worm-gear is produced—that is to say, a disk with the usual teeth in its margin set at an incline to cause them to properly engage the worm 30 and with a secondary or supplemental worm or screw cam formed circumferentially therein transversely of the gear-teeth. In this arrangement the worm 30 acts upon the teeth, (indicated at 33,) and the circumferential worm-surface (indicated at 34) acts upon the oblique teeth 20. By this means it will be readily understood motion imparted to the shaft 27 will cause the worm 30 to engage the teeth 33 and revolve the gear 31 and cause the larger worm-surface 34 to engage the teeth 20 and transmit a rotary motion to the disk 18 and thence through the key 19 to the piston-rod 16 and its piston-head 36. By this arrangement of gears it will be noted a comparatively slow motion imparted to the shaft 27 by reason of the relative sizes of the gears, as illustrated, will impart a very slow motion to the piston-head 36, so that the lubricant will be forced from the cylinder 10 in extremely small quantities.

In this device motion will be imparted to the shaft 27 by the vibrations of the weight 25, which will be moved intermittently by the motion of the machinery to which the device is connected, and this motion of the weight will be transmitted to the shaft 27 through the medium of a ratchet and pawl, the ratchet represented at 37 and connected to the shaft 27, and the pawl represented at 38 and attached to the weight movably by a pivot connection 39 at its lower end and held normally in engagement with the ratchet-teeth by a spring 40. The ratchet will be provided with a retaining spring-pawl 41 to prevent backward movement. By this arrangement it will be understood when the device is attached to a moving portion of machinery at each movement the weight 25 will be thrown outward, carrying the pawl 38 with it and engaging the next tooth of the ratchet, and then at the return stroke the weight will cause the pawl to revolve the ratchet, and with it the shaft 27, forward the distance of one tooth of the ratchet, and so on continuously, each stroke of the machinery causing the weight 25 to be thrown outward, and at each return stroke the gravity of the weight will cause the shaft 27 to be revolved the distance of one of the teeth of the ratchet. Thus the shaft 27 will be intermittently revolved a short distance at each stroke and transmit motion very slowly to the piston 36, as before described. The device is thus automatically self-regulating as to speed, the greater the speed the more frequent the actions of the weight 25, and consequently the more rapidly is the lubricant forced from the cylinder, so that the quantity of the lubricant imparted to the journals to be lubricated will correspond to the speed. As a general thing the faster the speed the greater the quantity of lubricant required, and with this device it will be obvious the lubricant will be applied automatically as fast as required, thus securing great economy in its use and entirely avoiding waste of the lubricating material. The parts may be very nicely proportioned and adjusted, so that just exactly the right quantity will be discharged through the plug 14, and by varying the sizes of the gears the quantity may be very nicely gaged to meet the requirements and avoid waste, on one hand, and the danger of "dry" or hot journals on the other hand. The lubricant may thus be fed to the machinery continuously while in motion, and when not in motion the lubricant will be held passive in the cylinder, so that no waste occurs when the machinery is idle.

With this device the semisolid lubricants may be very efficiently employed, as the lubricant is positively forced from the cylinder by the movement of the piston-head. It is necessary, however, to employ the removable plug 14, so that lubricants of varying density may be used with a single cylinder without altering the adjustment of its force-feed mechanism and the too-rapid flow due to air getting into the cup is prevented.

The proportions of the device may be changed and varied and the parts modified in minor details without affecting the principle of the invention or sacrificing any of its advantages.

Having thus described my invention, what I claim is—

1. In a device of the character described, a receiver for the lubricant internally threaded and having a contracted discharge-orifice and connected to partake of the motion of the machinery to be lubricated, a threaded piston-head engaging said receiver and having a piston-rod extending therefrom, a shell connected to said receiver, a gear within said shell slidably engaging said piston-rod and adapted to impart rotary motion thereto, a bar transversely arranged in said shell, a weight movably supported upon said bar and adapted to be vibrated by the motion of the machinery, a shaft journaled within said shell and carrying a ratchet-wheel, a pawl movably engaging said weight and supported yieldably in normal engagement with said ratchet-wheel, and mechanism between said shaft and said gear whereby the intermittent movement of said weight will be transmitted to said gear and the piston-head connected therewith, substantially as described.

2. In a device of the character described, a receiver for the lubricant connected to partake of the motion of the machinery to be lubricated and internally threaded, a threaded piston-head engaging said receiver, a piston-rod extending from said piston-head, a gear having upwardly-extended obliquely-disposed teeth and movably engaging said piston-rod, a weight adapted to be vibrated by the motion of said machinery, a shaft revolubly supported above said receiver, means carried by said weight whereby its vibrations will be caused to intermittently revolve said shaft, a worm carried by said shaft, a worm-gear between said shaft and said oblique gear and adapted to be engaged by said worm-pinion, and provided with a circumferential worm-channel formed in its periphery transversely of its teeth and adapted to engage said oblique teeth, whereby the vibratory motion of said weight will be slowly transmitted to said piston-head, substantially as described.

3. In a device of the character described, a receiver for the lubricant having a contracted discharge-orifice and connected to partake of the motion of the machinery to be lubricated and provided with a threaded upper end, a cover internally and externally threaded and adapted to engage said receiver, a shell internally threaded and detachably engaging said cover, a piston within said receiver having a piston-rod extending therefrom through said cover, a weight movably disposed within said shell and adapted to be vibrated by the motion of said machinery, and mechanism within said shell between said weight and said piston-rod, whereby the intermittent movement of said weight will be transmitted to said piston-head, substantially as described.

4. In a device of the character described, a receiver for the lubricant connected to partake of the motion of the machinery to be lubricated, a follower within said receiver, a shell connected to said receiver, a bar connected transversely within said shell, a weight movably connected to one side of said bar and adapted to be vibrated by the motion of the machinery, a shaft revolubly supported by one end upon said bar and carrying a ratchet-wheel, a pawl movably connected to said weight and extending on the opposite side of said bar therefrom and adapted to yieldably engage said ratchet-wheel, and mechanism between said shaft and said follower whereby the vibratory motions of said weight will be transmitted to said follower, substantially as described.

In testimony that I claim the foregoing as my own I have hereto affixed my signature in the presence of two witnesses.

JONAS AUGUST SWENSON.

Witnesses:
 CHARLEY PETERSON,
 JOSEPH STROMQUIST.